A. E. CHURCH.
CHUCK.
APPLICATION FILED JUNE 23, 1914.
1,219,083.
Patented Mar. 13, 1917.
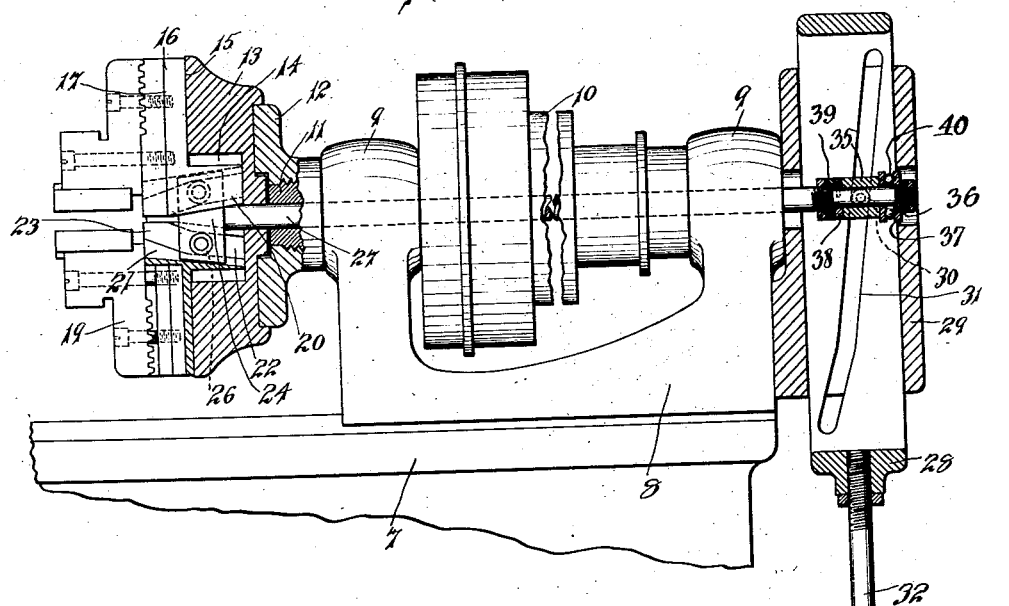
Fig. 1.
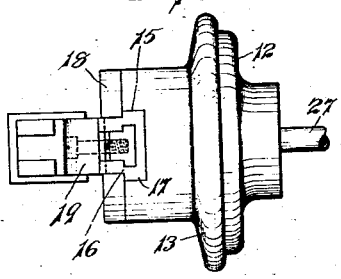
Fig. 2.
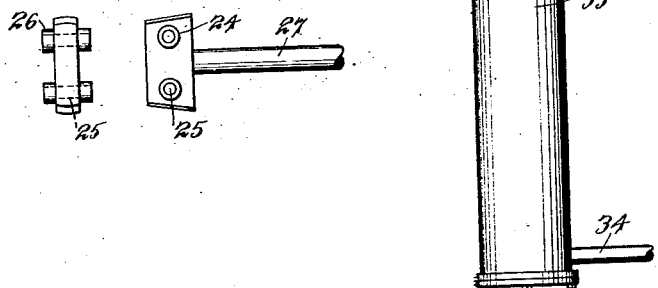
Fig. 3.
Fig. 4.
WITNESSES:
Louis Lucia
C. F. Eaton.
INVENTOR.
Albert E. Church.
BY
Arthur Jenkins,
ATTORNEY.

UNITED STATES PATENT OFFICE.

ALBERT E. CHURCH, OF NEW BRITAIN, CONNECTICUT, ASSIGNOR TO UNION MANUFACTURING COMPANY, OF NEW BRITAIN, CONNECTICUT, A CORPORATION OF CONNECTICUT.

CHUCK.

1,219,083.   Specification of Letters Patent.   Patented Mar. 13, 1917.

Application filed June 23, 1914.  Serial No. 846,790.

*To all whom it may concern:*

Be it known that I, ALBERT E. CHURCH, a citizen of the United States, residing at New Britain, in the county of Hartford and State of Connecticut, have invented a new and Improved Chuck, of which the following is a specification.

My invention relates more especially to that class of chucks in which the jaws are opened and closed by means of fluid pressure, and an object of my invention, among others, is to provide a device of this class that shall be particularly efficient in its operation.

One form of chuck embodying my invention and in the construction and use of which the objects herein set out, as well as others, may be attained, is illustrated in the accompanying drawings, in which—

Figure 1 is a view of a portion of a lathe equipped with a chuck embodying my invention and with parts broken away to show construction.

Fig. 2 is a perspective view of one of the jaw supports.

Fig. 3 is an end and side view of the jaw actuator.

Fig. 4 is a view in side elevation of the chuck body looking toward the end of the jaws.

In the accompanying drawings the numeral 7 denotes the bed of a machine, as a lathe, and 8 a spindle bearing head located upon the bed and having bearings 9 for a spindle 11 mounted therein in any suitable manner, said spindle having a cone pulley 10 secured thereto. A chuck body secured to the spindle is composed of a disk 12 fitting the screw threaded end of the spindle and a base 13 secured to the disk in any suitable manner. The base has a central recess 14 and radial grooves 15 located in its face and extending preferably from its outer edge into the recess 14.

Jaw supports 16 are located in the recesses 14, each support having a broadened part 17 forming a shoulder to receive a face plate composed of sections 18 secured to the base 13 in any suitable manner, these jaw supports in fact being T-shaped in cross section and the grooves 15 and face plate sections 18 forming a T-shaped groove in which the T-shaped jaw supports are slidably located. Jaws 19 of any desired construction are secured to the jaw supports in any suitable manner to clamp a piece of work between them. In the construction herein shown only two jaw supports with jaws secured thereto are employed, but it will be understood that any number of jaws that may be desired may be used.

Each jaw support is provided at its inner end with a projection 20 adapted to extend into the central recess 14 in the base 13, and a groove 21 extends along the projection 20 preferably from end to end.

Actuating grooves are formed in the walls of the groove 21 in each jaw support, these actuating grooves being located opposite and opening toward each other, each actuating groove being disposed as a cam groove and consisting of a holding cam 22 and an accelerating cam 23. A jaw actuator 24, located in the recess 14, extends between the jaw supports and into the groove 21 in each, and actuating studs 25, preferably bearing rollers 26, extend from opposite sides near each end of the actuator into the actuating grooves. An actuating rod 27 extends from the actuator 24 through the spindle 11 into an opening in an actuating slide 28 mounted in a bearing 29 secured to the end of the spindle bearing head. Studs 30, preferably bearing rollers are secured to a sleeve 35 loosely mounted upon the actuating rod 27 between collars 37 and 38 held in place by nuts 36 and 39, balls 40 being located between the collar 37 and nut 36. The studs 30 and rollers located thereon project into cam slots 31 diagonally arranged in the side parts of the slide formed by the opening therein. A slide rod 32, connected to the slide, projects into a cylinder 33, being secured to a piston (not shown) therein, the cylinder being supplied with a pressure medium, as air, through an inlet pipe 34, this supply being suitably controlled in any well known manner, to effect movement of the slide rod 32 and hence of the jaw actuator 24 to operate the jaws.

The angle of the holding cam 22 with respect to the axis of the actuating rod 27 is such that when the studs 25, or rollers thereon, are engaged in said grooves, in which position the chuck jaws will be clamping a piece of work, little, if any, force will be required to hold the actuator in this position and the jaws thus securely clamped against the piece of work. As the actuator is moved to release the jaws, the studs pass into the accelerating cam grooves 23, thus increasing the rapidity of movement of the jaws, it being apparent that this reciprocating movement of the actuator imparts sliding movement to the jaw supports.

While I have shown and described herein a satisfactory form of mechanism for accomplishing my purpose this may be departed from to a greater or lesser degree and yet be within the spirit and intent of the invention as defined by the appended claims.

I claim—

1. A chuck body, a member movable radially therein and having a groove extending transversely to its direction of movement in the chuck body, grooves opening toward each other in the walls of the first mentioned groove and having accelerating and holding parts, an actuator, and means in engagement with said accelerating and holding parts of said grooves and connecting said actuator with said member to reciprocate the latter.

2. A chuck body, members arranged upon diametrically opposite sides of said body and movable radially therein, said members having grooves extending transversely to their direction of movement on the chuck body and with grooves opening toward each other in the walls of the first mentioned grooves, an actuator extending into said first mentioned grooves and having projections extending into the grooves in the walls of said first mentioned grooves, and means for operating said actuator.

3. A chuck body, a member movable radially therein, said member having a groove with parallel opposing walls and formed into an accelerating and a holding portion, an actuator, and means in engagement with said groove, and connecting the actuator with said member to cause said actuator to impart reciprocating movement to said member.

4. A chuck body, a member movable radially therein, said member having a groove with parallel opposing walls and formed into a cam groove constituting an accelerating and a holding portion, an actuator having a projection extending into said groove to impart reciprocating movement to said member, and means for operating the actuator.

5. A chuck body having a central recess, a member slidably mounted on the chuck body and having a projection entering said recess and extending therein axially of the chuck body, an actuator, and a connection between said actuator and projection to reciprocate said member.

6. A chuck body, a member movably mounted thereon and having an extension from one end thereof extending therein axially of the chuck body, said extension having a cam groove, an actuator with means for operating it, and a connection between said actuator and slidable member including means engaged within said cam groove.

7. A chuck body having a recess, a member movably mounted on said body and having a projection entering said recess and extending therein axially of the chuck body, said projection having a cam groove, an actuator with means for operating it, and a projection from said actuator entering said cam groove.

8. A chuck body having radial grooves and a recess centrally located in the chuck body and extending below the bottom of said grooves, a pair of members oppositely disposed and movable radially in said grooves, said members having projections from their inner ends extending into said recess below the bottom of the grooves, an actuator located between said projections, and operative connections between said actuator and said members.

9. A chuck body, a member movably mounted thereon, a reciprocating actuator operatively connected therewith, a slide having a cam, a projection from said actuator in engagement with said cam, and means for reciprocating the slide.

10. A chuck, a member movably mounted thereon, an actuator reciprocatingly engaged therewith, a slide having an opening with a cam groove therein, a projection from said actuator located in said cam groove, and means for operating the slide.

11. A spindle bearing head, a spindle mounted therein, a chuck secured to the spindle, a member movably mounted on the chuck, an actuator extending lengthwise through the spindle, a slide bearing secured to said member head, a slide located in said bearing and having a cam groove, a stud projecting from the actuator into said groove, and means for reciprocating the slide.

12. A chuck body having a recess extending axially therein, a member movable radially on the chuck body and having a projection extending into said recess and a groove extending along said projection, said groove having two parts angularly arranged one with respect to the other, an actuator, a projection from the actuator extending into said groove, and means for operating the actuator.

13. A chuck body having oppositely disposed grooves radially arranged therein and a recess centrally arranged and extending below the bottoms of said grooves, a pair of members oppositely disposed and movable radially in said grooves, said members having projections on their inner ends extending into said recess, cam grooves formed in said projections, each cam groove having one part angularly disposed with respect to the other part, an actuator, projections from said actuator extending into said cam grooves, and means for operating the actuator.

14. A chuck body having jaw grooves oppositely disposed and radially arranged therein and with a recess centrally arranged and extending below the bottom of said grooves, a pair of chuck jaws oppositely disposed and movable in said grooves, each jaw having a projection from its inner end entering said recess with actuator grooves extending along the inner edges of said jaws and the projections thereon and with cam grooves oppositely arranged in the walls of said actuator grooves, an actuator, projections extending from said actuator into said cam grooves, and means for operating the actuator.

15. A chuck body, a member movable radially therein, an actuator, one of said parts (member or actuator) having a groove with parallel opposing walls and formed into accelerating and holding portions, and the other part having means in engagement with said groove to impart reciprocating movement to said member.

ALBERT E. CHURCH.

Witnesses:
GEORGE H. INGRAHAM,
H. E. MYERS.